United States Patent [19]
Allen et al.

[11] Patent Number: 5,473,998
[45] Date of Patent: Dec. 12, 1995

[54] CEMENT KILN HAVING TIRE INJECTION SYSTEM

[75] Inventors: Donald S. Allen, Toledo, Ohio; Verne A. Stuessy, Mason City, Iowa; John R. Buta; Ronald F. Teal, both of Salem, Ohio

[73] Assignee: Holnam, Inc., Dundee, Mich.

[21] Appl. No.: 232,796

[22] Filed: Apr. 25, 1994

[51] Int. Cl.[6] ..................................................... F23G 5/00
[52] U.S. Cl. .................... 110/247; 110/246; 432/106; 432/117; 432/239; 414/160; 414/161; 414/162
[58] Field of Search ...................................... 432/106, 117, 432/239; 110/246, 247; 414/161, 160, 162

[56] References Cited

U.S. PATENT DOCUMENTS

| | | | |
|---|---|---|---|
| 3,083,846 | 4/1963 | Walker et al. | 432/117 |
| 4,930,965 | 6/1990 | Peterson et al. | 414/149 |
| 5,081,937 | 1/1992 | Ishida et al. | 110/246 |
| 5,273,355 | 12/1993 | May et al. | 366/23 |
| 5,302,118 | 4/1994 | Renegar et al. | 432/14 |
| 5,377,603 | 1/1995 | Reese et al. | 110/346 |

Primary Examiner—Henry A. Bennett
Assistant Examiner—Siddharth Ohri
Attorney, Agent, or Firm—Harness, Dickey & Pierce

[57] ABSTRACT

A cement kiln having a tire injection system. The tire injection system comprises an entrance chute having an outer end portion protruding outwardly of a wall of the kiln and an inner end portion which protrudes into the kiln. The entrance chute further is disposed such that it is positioned tangentially to the kiln wall. The entrance chute includes a gate assembly having a cam follower assembly and a pivotally mounted gate member. The cam follower assembly causes the gate member to be urged pivotally between open and closed positions in response to movement of the cam follower assembly over a cylindrical camming wall positioned at a predetermined location relative to the kiln. When the cam follower assembly has caused the gate member to open, a plurality of tires or other items forming a source of supplemental fuel are injected into the entrance chute by one or more external tire injecting apparatuses synchronized in operation to rotation of the kiln. The tires or other fuel items are positively propelled at the time the entrance chute is aligned with the injecting apparatus. A dam formed at the inner end portion of the entrance chute prevents highly fluidized material within the kiln from flowing up into the entrance chute and further forms a channel relatively free of the fluidized material into which the tires may be injected during a predetermined portion, or portions, of rotational travel of the kiln. The apparatus thus allows whole tires or other fuel items or packets to be injected without the use of gravity feed and without the turbulence and splashing otherwise associated with previously developed injection systems.

26 Claims, 12 Drawing Sheets

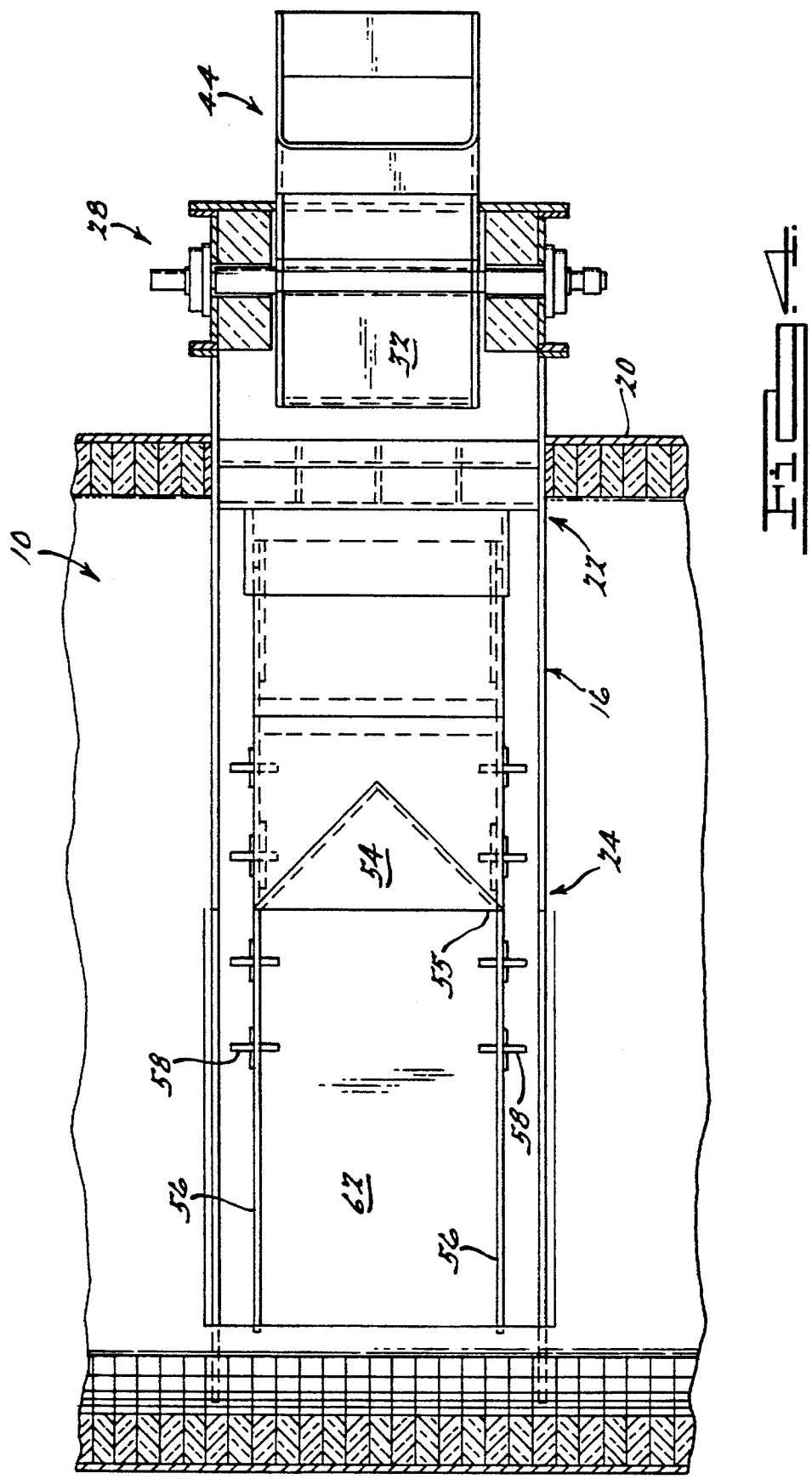

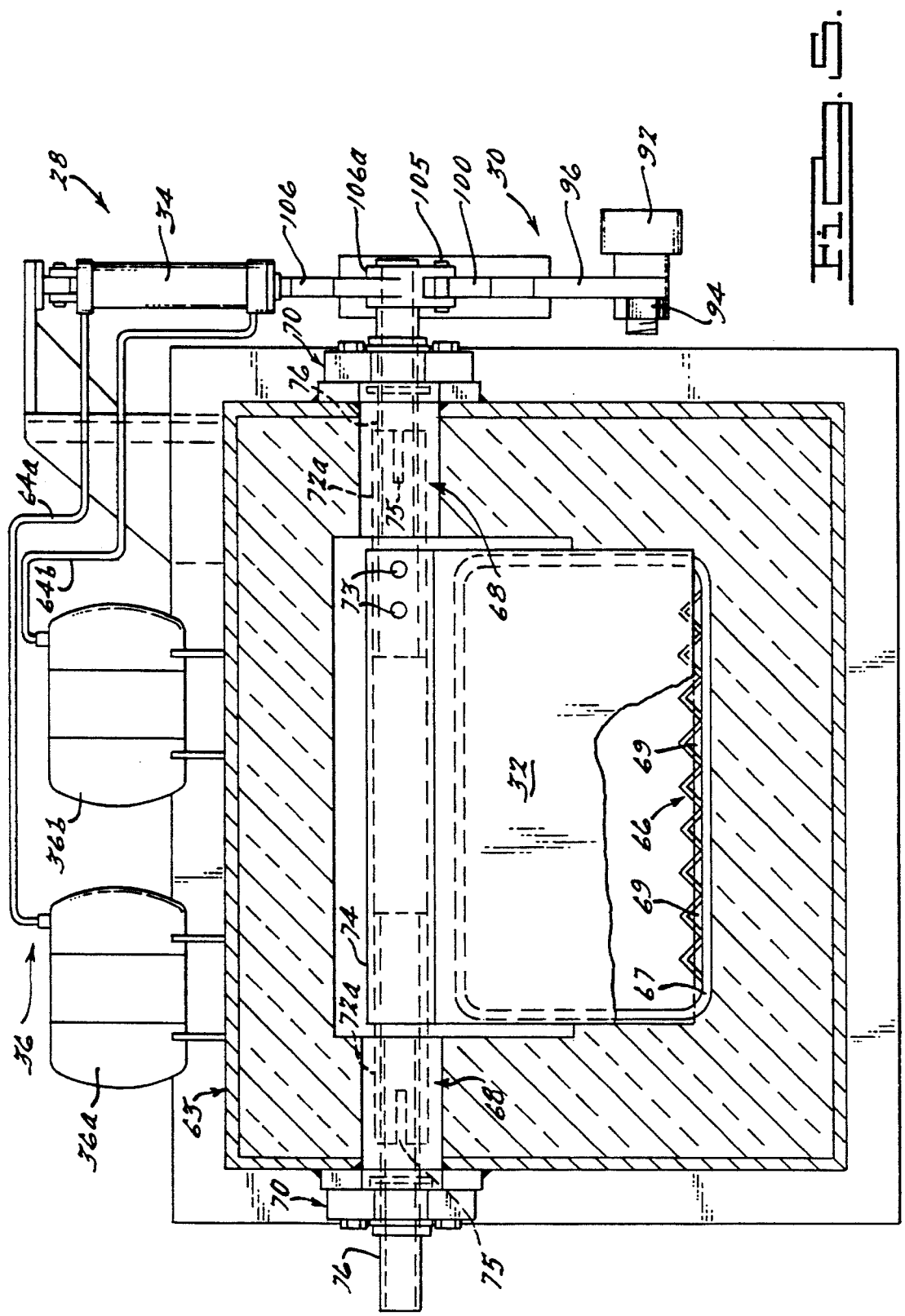

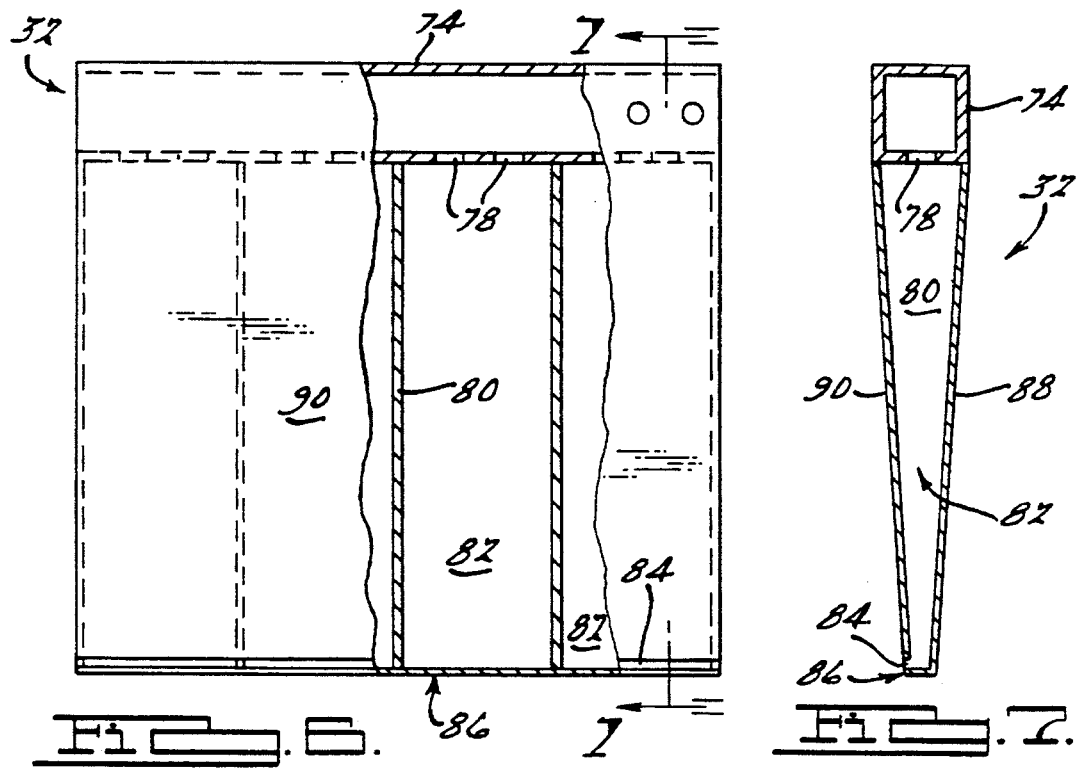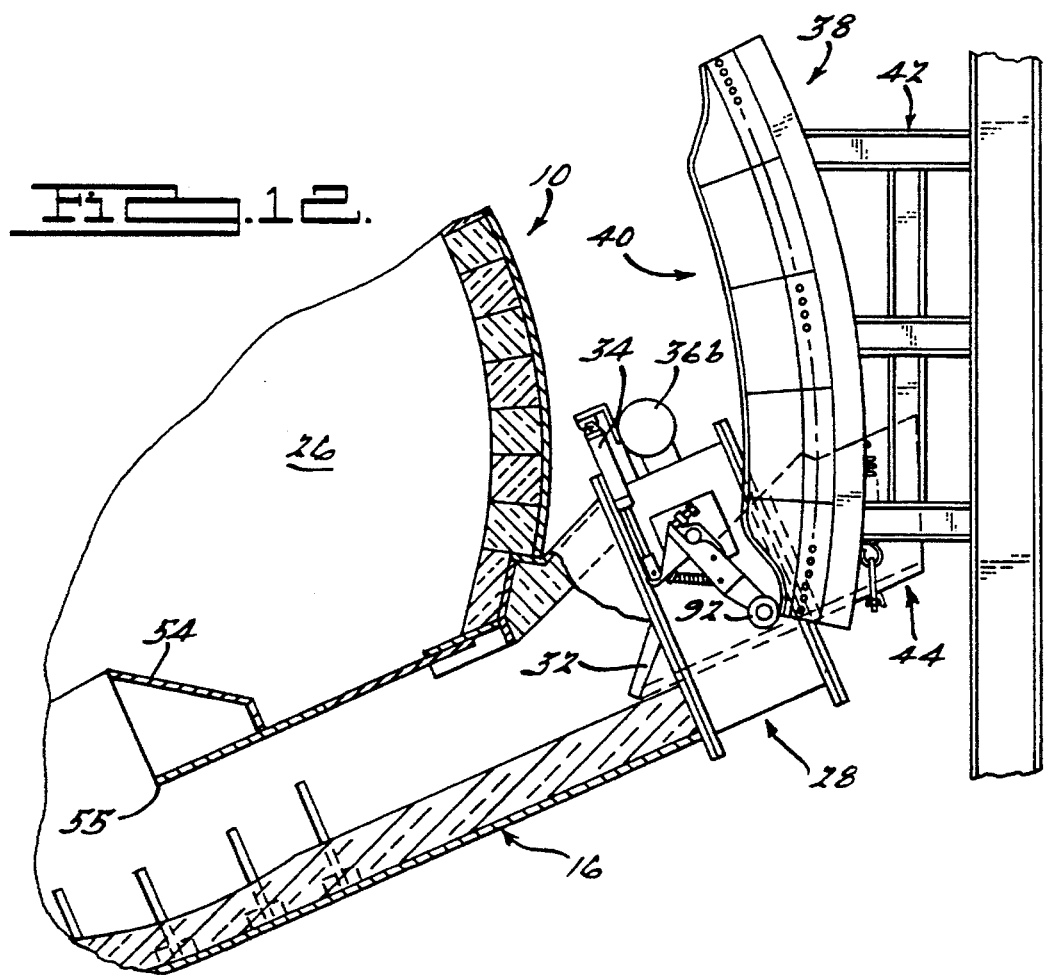

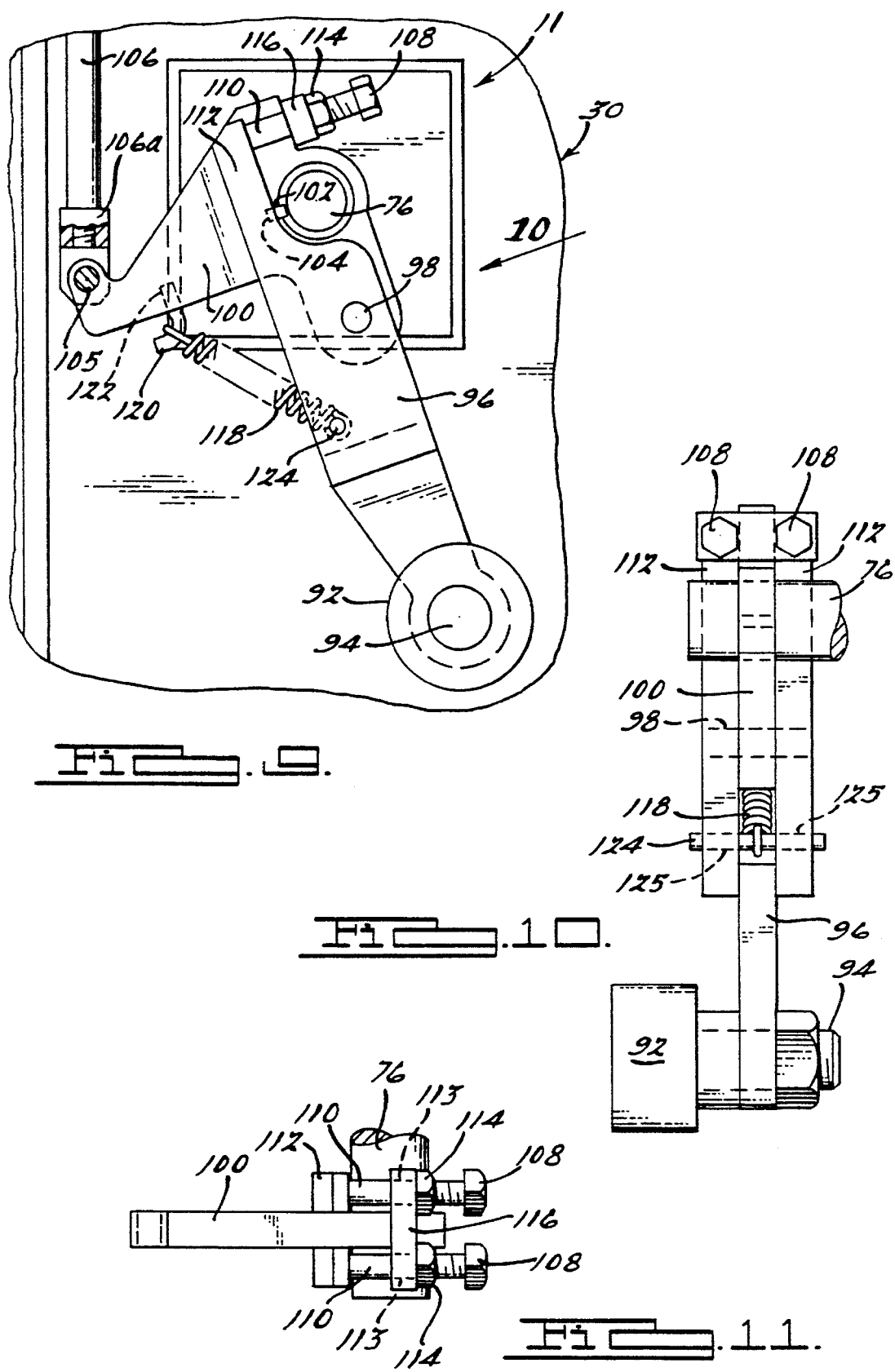

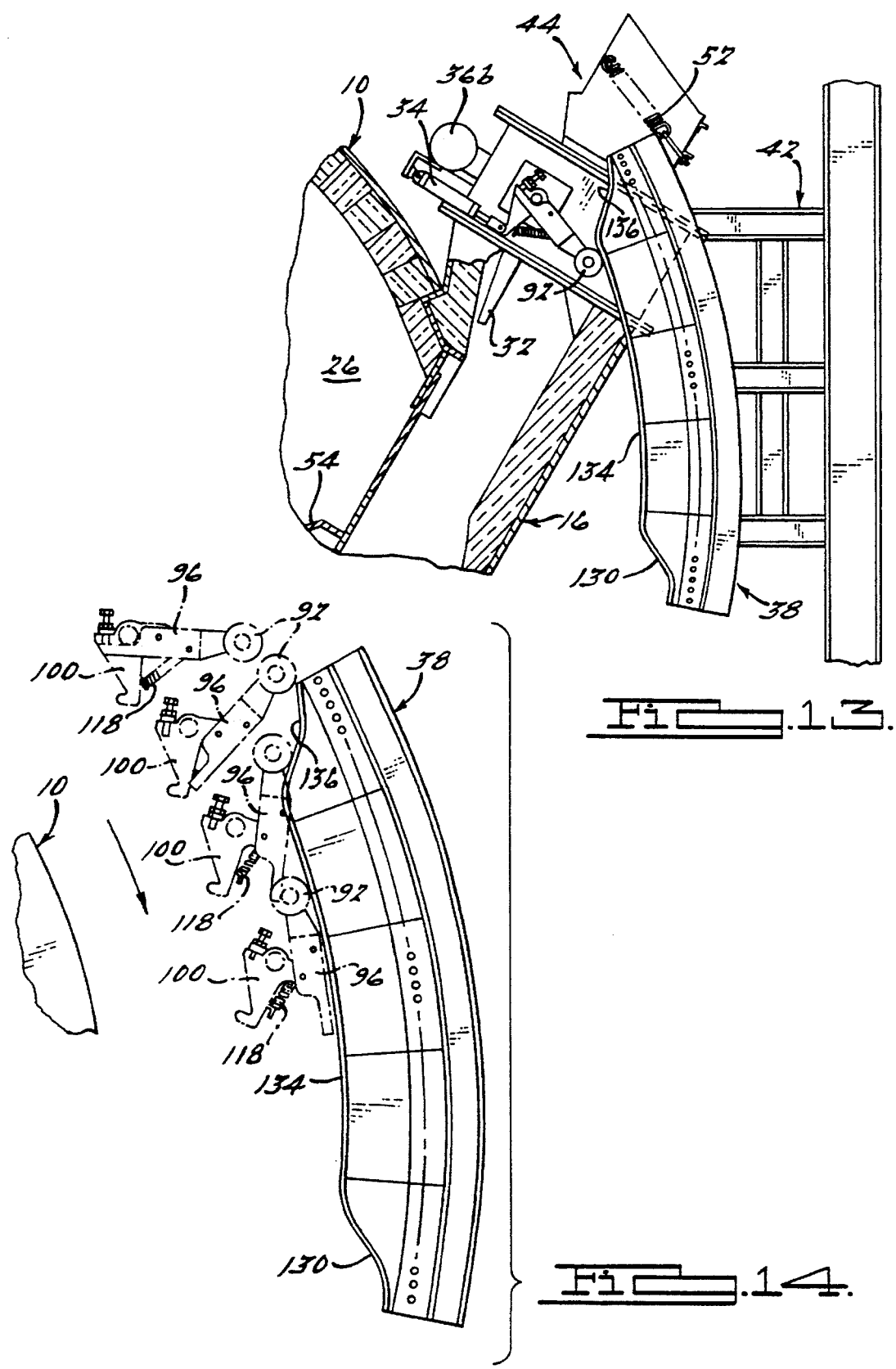

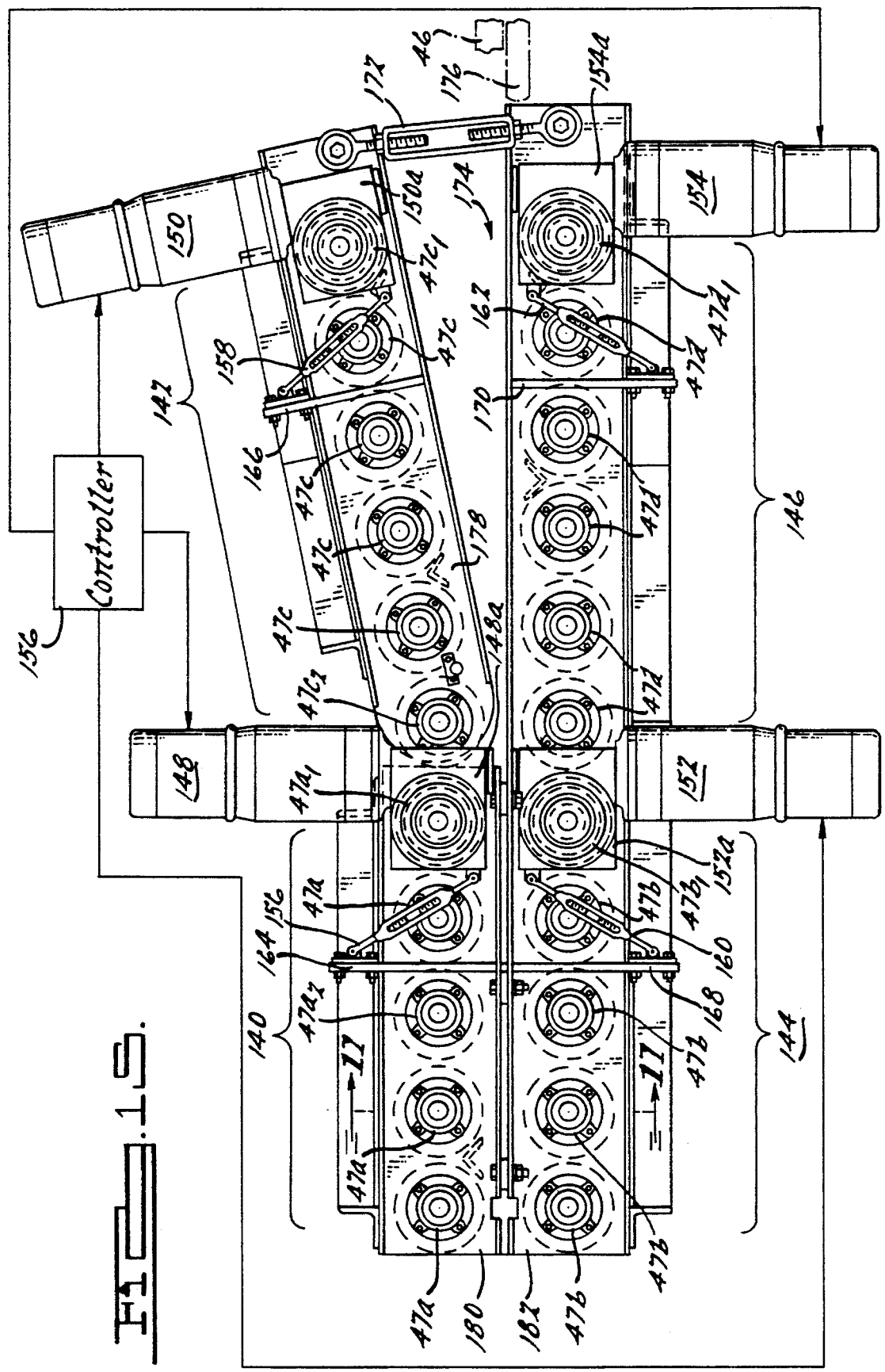

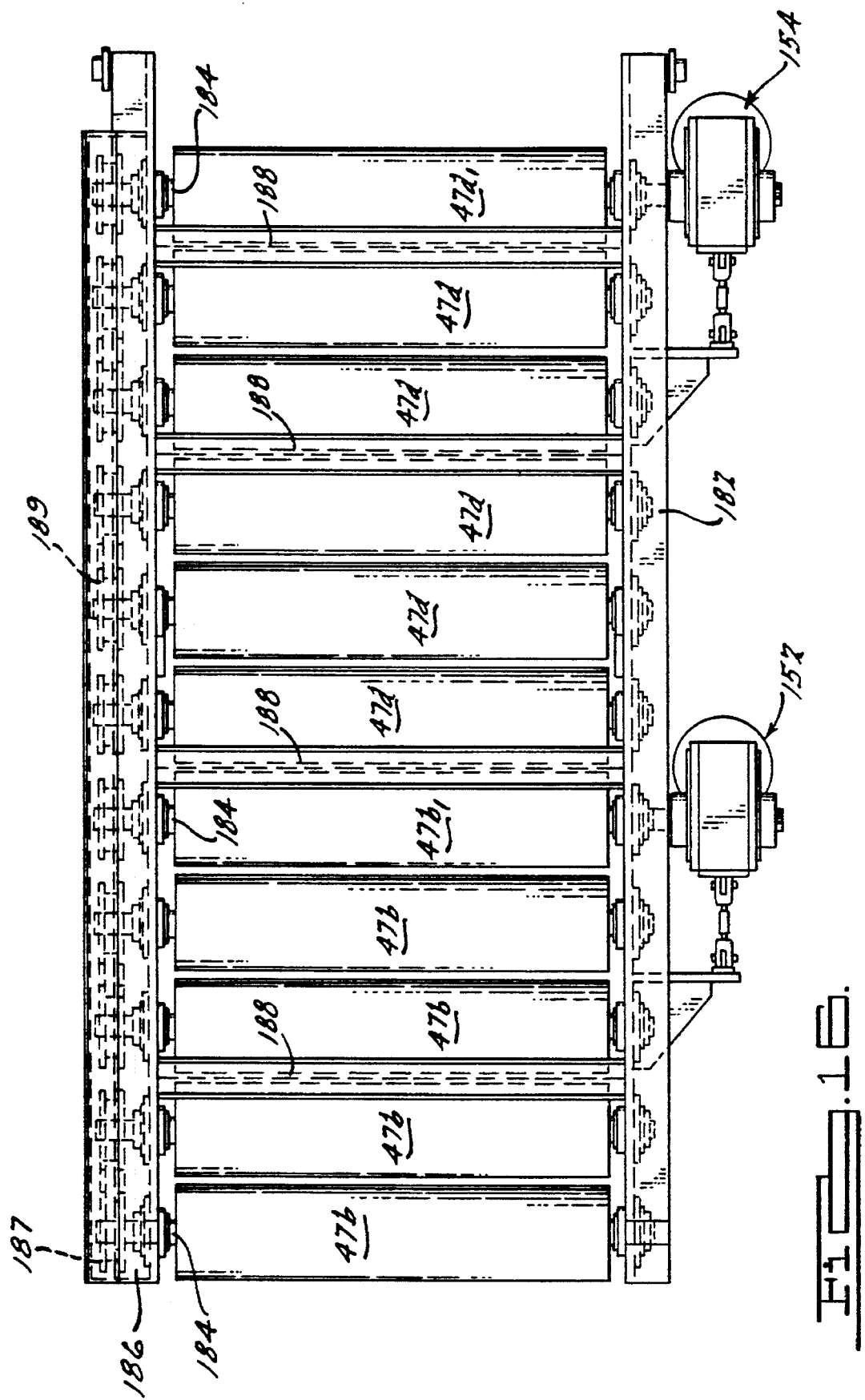

CEMENT KILN HAVING TIRE INJECTION SYSTEM

BACKGROUND OF THE INVENTION

1. Technical Field

This invention relates to a rotating kiln having a tire injection system for injecting whole tires into the kiln such that the tires can be used as a source of supplemental heat for the kiln.

2. Discussion

Rotary kilns have heretofore been used to burn various forms of liquid and solid combustible waste as a source of relatively inexpensive supplemental heat. The extremely high temperatures within such kilns, which typically reach up to and above 3400° F., combined with the long residence times of such waste within such kilns, have proven to be effective in completely combusting various forms of waste while producing little or no undesirable gaseous or solid emissions. Since such wastes form a supplemental source of inexpensive heat for a cement kiln, this also reduces the operating cost of the kiln.

One form of waste which has been heretofore used is worn out automobile and truck tires. Rubber tires burn extremely hot, and thus make a very good source of supplemental heat for a rotary kiln. The extremely high temperatures within a cement kiln serve to burn rubber tires without any significant liquid, solid or gaseous waste byproducts which might be detrimental to the environment. Since tires currently present a disposal problem, burning tires in rotary kilns serves to help alleviate the growing problem of insufficient means for disposing of used rubber tires without impairing the environment.

Prior art rotary kilns involving the injection of tires have typically suffered from several drawbacks. Initially, some systems require that the tires be cut and packaged into "fuel packages" having relatively specific outer dimensions. Such preparation of used tires obviously adds to the overall cost of operating the kiln and may also require the use of special equipment and additional manpower to cut the tires and package the resulting pieces into suitably sized packages.

Other systems allow entire tires, as well as other supplemental forms of fuel, to be inserted into the kiln but rely on gravity feed to accomplish this. Such systems frequently have some form of opening in the kiln wall with a loading area adapted to support a tire or other supplemental fuel source as the kiln rotates. When the loading area becomes disposed substantially vertically, gravity causes the tire or other fuel item to slide into the interior area of the kiln. The drawback with these types of systems is that the tire or other fuel item must be dropped into the highly fluidized material from a relatively high elevation, thus causing a splash in the material and creating excessive turbulence within the kiln. Therefore, using a gravity feed system, it has heretofore been necessary to insert each tire or fuel item (or "packet") while the tires or fuel items are positioned at or near the highest point of rotational travel of the kiln in order to make use of gravity in inserting the tires into the kiln.

It is therefore a principal object of the present invention to provide a rotary kiln having a means by which an item representing a supplemental form of fuel may be positively injected into the kiln during a portion of the rotational travel of the kiln, and which does not rely on gravity to accomplish the injection of the supplemental fuel item.

More particularly, it is an important object of the present invention to provide a cement kiln having a whole tire injection system which injects whole tires into the interior area of the kiln such that the tires come to rest in the bottommost portion of the kiln without causing splashing or other turbulence of the fluidized material within the kiln.

It is another object of the present invention to provide a cement kiln having a rotating tire injection system which operates to positively inject whole tires into an interior area of the kiln without relying solely on gravity feed, to therefore enable a plurality of whole tires or other fuel items to be injected into the kiln at virtually any point about the periphery of the kiln during a given revolution.

It is still another object of the present invention to provide a cement kiln having a tire injection system which does not require the used tires to be cut up or otherwise packaged in a specific manner, but instead allows entire tires to be injected into the interior area of the kiln as a supplemental heat source.

It is still another object of the present invention to provide a cement kiln having a whole tire injection system which includes structure within the cement kiln for keeping the highly fluidized material away from an entrance chute of the kiln during a predetermined degree of rotational travel of the kiln, thereby allowing whole tires to be positively injected into the kiln and the fluidized material to thereafter flow onto the injected tires, thus minimizing the turbulence created in the fluidized material by the tire injection process.

It is yet another object of the present invention to provide a rotary kiln having an injection system for injecting a wide variety of items representing supplemental sources of heat into the kiln, including but not limited to whole tires, shredded portion of tires, products, bundled paper and cardboard products, containerized waste products, pieces of coal, etc., or virtually any other form of supplemental fuel which is capable of being presented in packets, bundles, or pieces suitable to be forcibly projected into the kiln.

It is yet another object of the present invention to provide a cement kiln having a whole tire injection system which may be relatively easily fitted to existing kilns to allow whole tires to be positively injected therein.

SUMMARY OF THE INVENTION

The above and other objects are provided by a rotary cement kiln having a whole tire injection system in accordance with preferred embodiments of the present invention. It will be appreciated immediately, however, that the methods and apparatus of the preferred embodiments are not limited to use with whole tires. Rather, the methods and apparatus of the present invention may easily be used, with little or no modification, with virtually any other item or packet representing a supplemental fuel source which is capable of being projected into a kiln, and which does therefore not rely on gravity to be moved into the interior of the kiln. For the purpose of the following discussion, however, whole tires will be referred to principally throughout as the supplemental fuel source. The apparatus of the present invention includes an entrance chute which includes a portion protruding outwardly of an outer wall of the rotary kiln and an inner end portion which protrudes into an interior area of the kiln. The entrance chute is further formed so as to be positioned tangentially to the outer wall of the kiln.

The entrance chute further includes at its inner end portion means forming a dam which prevents fluidized material within the kiln from entering the area immediately adjacent an outlet of the entrance chute. This enables whole tires to be injected through the entrance chute and to come to rest within the kiln without causing a splash or other turbulence by sudden contact with the fluidized material therein.

At the outer end portion of the entrance chute is a gate assembly which operates to close the entrance chute during predetermined portions of rotational travel of the kiln. The gate assembly, when opened, allows whole tires to be injected into the entrance chute during at least one predetermined portion of rotational travel of the kiln, which does not have the topmost portion of rotation of the kiln.

The gate assembly is controlled in part by a camming wall portion disposed generally concentrically with the rotating kiln at a predetermined position relative to the outer periphery of the kiln. As the gate assembly moves over the camming wall portion, a cam follower assembly of the gate assembly causes the gate assembly to open. As the gate assembly moves off of the camming wall portion, the gate assembly is allowed to close. Thus, the entrance chute is only opened during a predetermined portion of rotational travel of the kiln. This predetermined portion of rotational travel is that portion of travel during which the inner end portion of the entrance chute, and thus the dam formed at the end of the inner end portion, is positioned at or near the bottommost portion of rotational travel of the kiln.

When a tire is injected into the entrance chute during rotational travel of the kiln, the tire passes through the entrance chute and comes to rest in an area closely adjacent to the dam. The dam prevents the highly fluidized material within the kiln from filling the area immediately adjacent the outlet of the entrance chute, thus allowing the tires to be injected into the kiln without causing a splash or other turbulence. As the kiln continues to rotate the fluidized material flows over the dam and onto the tires. This form of injection significantly reduces the turbulence and splashing otherwise associated with injecting tires by gravity feed systems.

In alternative preferred embodiments, the outermost end portion of the entrance chute includes a guide assembly having an auxiliary lower relief door which is pivotally disposed and maintained in a normally closed position by a biasing member. The relief door opens by the force caused by a jam of one or more tires to allow the jammed tire to drop out of the entrance chute, thereby alleviating the jam, should such a jam occur.

In another preferred embodiment the gate assembly includes a gate member having air passageways therein which allow ambient air to circulate through the interior of the gate member, thus helping to cool the gate member. In another preferred embodiment the entrance chute further includes a lower support wall having a generally saw-tooth shape which helps to facilitate the sliding of the injected tires through the entrance chute by keeping the tires off of the hot flat interior surfaces of the entrance chute for a portion of their travel.

BRIEF DESCRIPTION OF THE DRAWINGS

The various advantages of the present invention will become apparent to one skilled in the art by reading the following specification and subjoined claims and by referencing the following drawings in which:

FIG. 4 is a plan view of a portion of the kiln and the tire injecting system showing the construction of the dam and the upright wall portions which form the channel into which whole tires may be injected inside the kiln;

FIG. 5 is a cross sectional end view in accordance with section line 5—5 in FIG. 2;

FIG. 6 is a broken-away, partial cross sectional view of the gate member of the present invention;

FIG. 7 is a cross sectional view of the gate member in accordance with section line 7—7 in FIG. 6;

FIG. 9 is a more detailed view of the cam follower assembly shown in FIG. 8;

FIG. 10 is a view of the cam follower assembly of FIG. 9 as viewed in the direction of arrow 10 in FIG. 9;

FIG. 11 is a view of the crank assembly of FIG. 9 in accordance with directional line in FIG. 9 without the shaft and coupling member of the pneumatic cylinder being shown;

FIG. 12 is a partial cross sectional view of the kiln and a partial broken-away view of the gate assembly showing the cam follower roller about to begin engagement with the camming wall portion;

FIG. 13 shows the cam follower roller about to roll off of the inner surface of the camming wall portion;

FIG. 14 shows the operation of the cam follower assembly when the kiln begins rotating in the opposite (i.e., counterclockwise) direction of rotation, which operation allows the gate member of the present invention to remain closed during counterclockwise rotation of the kiln;

FIG. 15 is an enlarged view of the tire injecting apparatus of FIG. 2;

FIG. 16 is a plan view of the rollers 47b and 47d of FIG. 15 and their associated support structure.

DETAILED DESCRIPTION OF THE PREFERRED EMBODIMENTS

Figure 1:
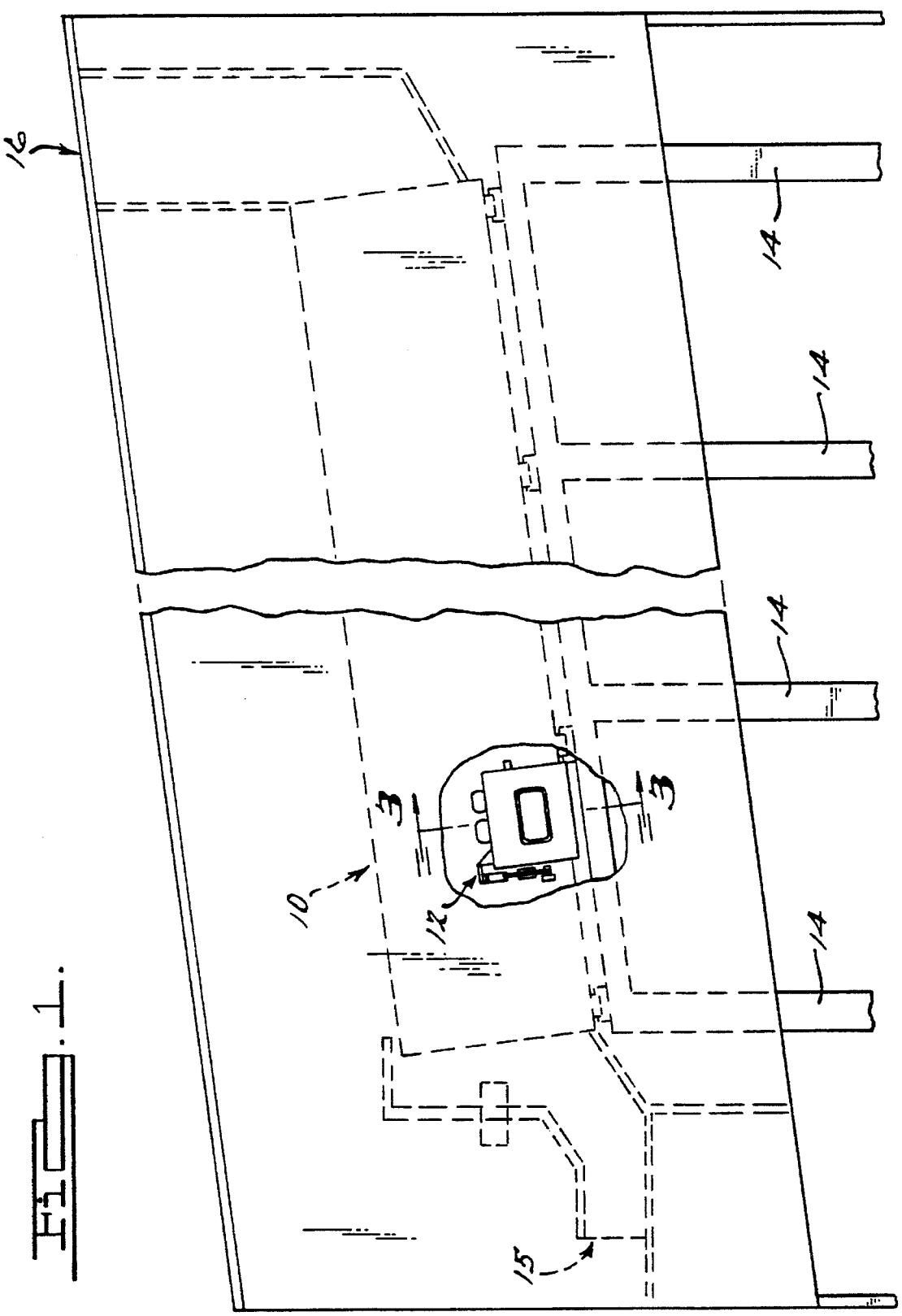
FIG. 1 is an elevational side view of a kiln having a tire injection system in accordance with the present invention.

Referring to FIG. 1, there is shown a cement kiln 10 having a whole tire injection system 12 associated therewith. The kiln 10 itself is supported above ground level by suitable supports 14 and includes inlet side 16 and an outlet side 15. The supports 14 are such as to permit rotation of the kiln 10. The tire injection system 12 rotates with the kiln 10.

Figure 2:
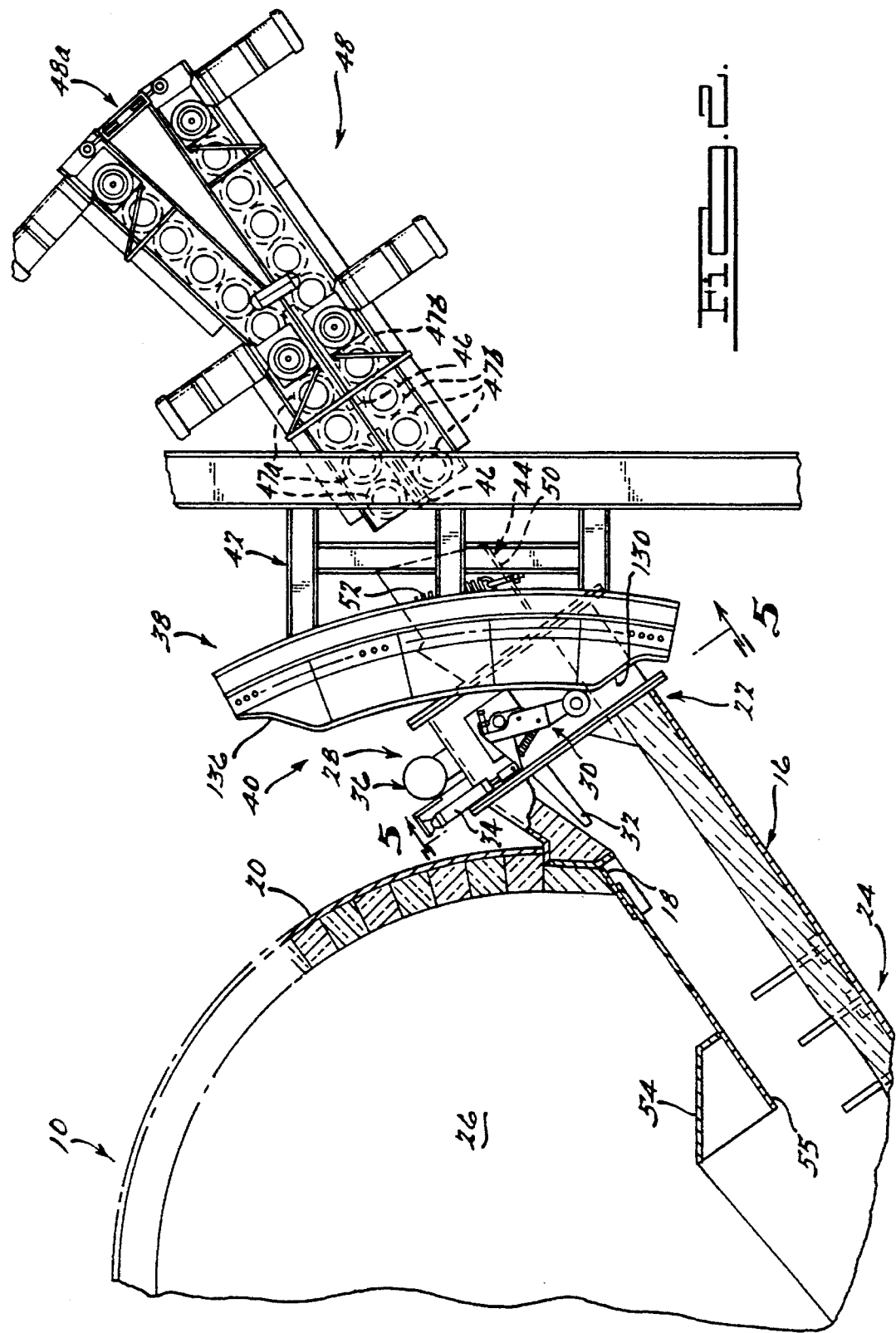
FIG. 2 is a partial cross sectional view of the kiln showing the tire injection system in greater detail, and further showing an external tire injecting apparatus for injecting whole tires into the kiln.

With reference to FIG. 2, the tire injection system 12 is shown in greater detail. The system 12 includes an entrance chute 16 extending through an opening 18 in an outer wall 20 of the kiln 10. The entrance chute 16 includes an outer end portion 22 extending outwardly of the outer wall 20 and an inner end portion 24 extending within an interior area 26 of the kiln 10.

Positioned adjacent the outer end portion 22 is a gate assembly 28. The gate assembly 28, which will be described in greater detail momentarily, generally includes a cam follower assembly 30, a pivotally mounted gate member 32, a pneumatic cylinder 34, and a source of compressed air 36. The cam follower assembly 30 rides along an inner camming surface 40 of a cylindrical camming wall portion 38 disposed concentrically with the kiln 10. The inner camming surface 40 is supported at a predetermined position relative to the rotation of the kiln 10 by a suitable frame structure 42. When the cam follower assembly 30 rides over the inner camming wall 40 during counterclockwise rotation of the kiln 10 (as viewed in FIG. 2), this causes the cam follower assembly 30 to urge the gate member 32 into an open position. When the cam follower assembly 30 moves off of the camming surface 42 the gate member 32 is urged into the closed position, thus closing off the entrance chute 16. It will be appreciated then, that the overall length of the inner camming surface 40 determines how long the gate member 32 remains open during rotation of the kiln 10. Also, the location of the camming wall portion 38 relative to the circumferential position of the kiln 10 outer wall 20 determines at what point during rotation of the kiln 10 the gate member 32 opens, as well as at what point during rotation the gate member 32 closes.

With further reference to FIG. 2, fixedly secured to the gate assembly 28 is a tubular guide assembly 44 for receiving tires 46 injected from one or more external tire injecting devices, such as a tire injecting apparatus 48, as the kiln 10 rotates. Thus, while only a single tire injecting apparatus 48 has been shown in the drawing of FIG. 2, for simplicity it will be appreciated that a plurality of such devices could be positioned about the periphery of the kiln 10 to inject tires at various points of rotational travel of the kiln 10. The guide assembly 44 includes an auxiliary lower relief door 50 which is biased into a normally closed position by a spring 52. The door 50 opens in response to forces generated by the jamming of one or more tires 46 within the guide assembly 44 or a failure of the injecting apparatus 48 to fully inject a tire 46. This provides a significant advantage in protecting against jams which might disrupt operation of the kiln 10, and allows the guide assembly 44 to pass the injecting apparatus 48 without potentially causing damage to the injecting apparatus 48 or the guide assembly 44. The spring 52 maintains the relief door 50 in a normally closed position when no jam is present. The tire injecting apparatus 48 is preferably mounted relative to the camming wall portion 40 such that when the gate member 32 is opened, the guide assembly 44 will be in relative alignment with the tire injecting apparatus 48, thus allowing the injection of tires 46 in the guide assembly 44. The tire injecting apparatus 48 injects the tires 46 by the use of powered rollers 47a and 47b which rotate rapidly to "shoot" tires out of the apparatus 48 as the tires 46 move into position between rollers 47a and 47b. In this regard it will be noted that rollers 47a are driven clockwise and rollers 47b counterclockwise in the drawing of FIG. 2. Tires 46 may be loaded into the apparatus 48 by a suitable conveyor or other like device capable of delivering the tires 46 into an inlet side 48a of the apparatus 48. The injection system 12 and injecting apparatus 14 are further positioned longitudinally along the kiln at a point where the temperature within the kiln 10 is preferably about 1800° F.

It is a principal feature of the present invention that the entrance chute 16 extends into the interior area 26 of the kiln 10 tangentially to the outer wall 20 of the kiln 10. As will be discussed further momentarily, this provides significant benefits over prior systems which require gravity feed to "drop" tires into the kiln through an opening in the kiln wall while the opening is disposed somewhere near the highest point of rotational travel of the kiln.

Figure 3:
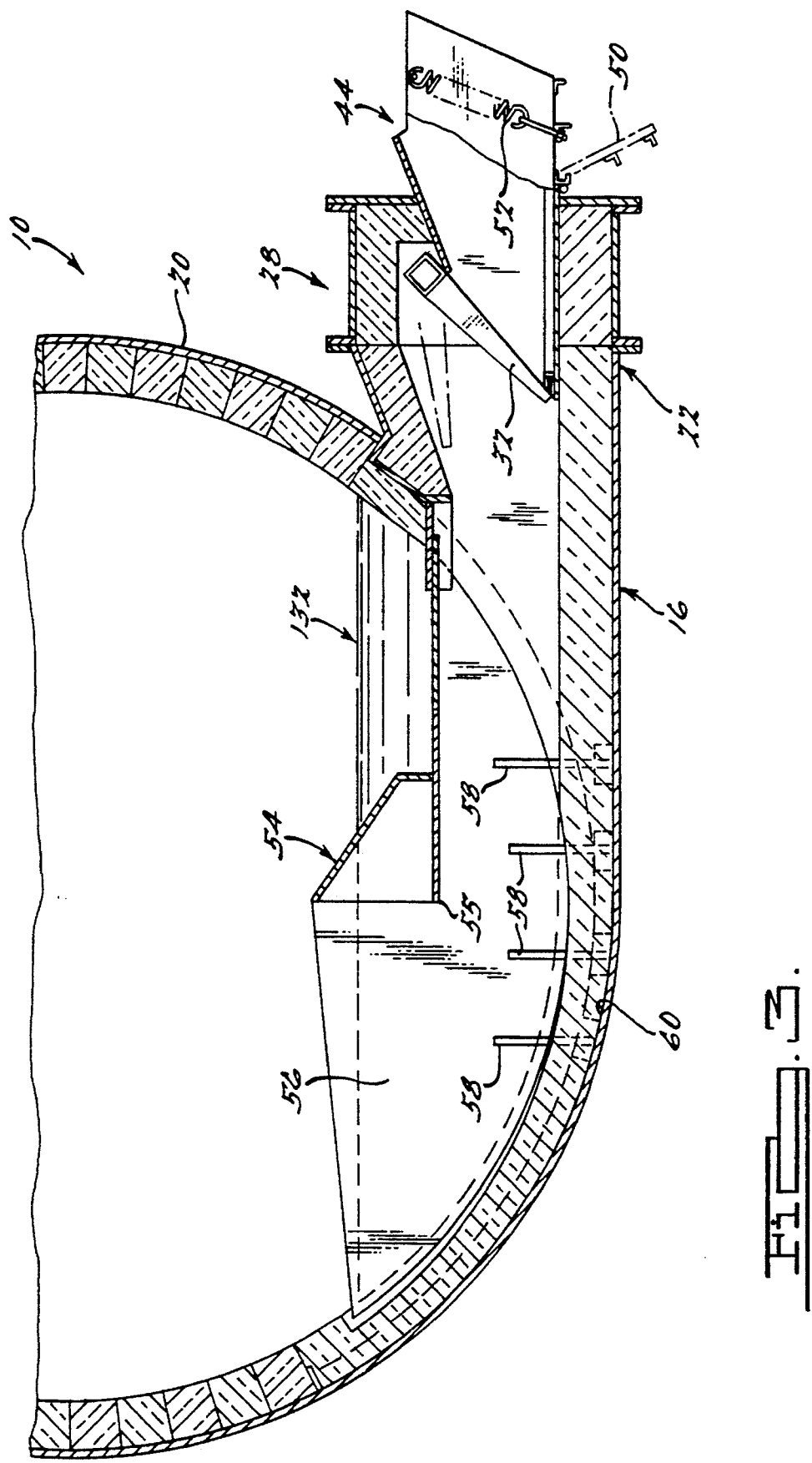
FIG. 3 is a cross sectional view of the kiln and the tire injecting system in accordance with section line 3—3 in FIG. 1.

Referring to FIGS. 2, 3 and 4, the inner end portion 24 of the entrance chute 16 includes a dam 54 which is formed at an outlet 55 of the entrance chute 16. The dam 54 is integrally formed with a pair of upright sidewall members 56, which also form part of the entrance chute 16. The sidewall members 56 are supported by suitable braces 58 which may be welded to an inner surface 60 of the kiln outer wall 20. With specific reference to FIG. 4, the upright sidewall members 56 form a channel 62 therebetween which helps to prevent the entry of highly fluidized raw material into the area defined by the channel 62 during a portion of rotational travel of the kiln 10.

Referring now to FIG. 5, the gate assembly 28 is shown in greater detail. The compressed air source 36 comprises a tank 36a of compressed air fixedly supported on an upper wall portion. An air tank 36b is included and is also fixedly supported on the upper wall portion 63. The air tanks 36a and 36b are coupled by suitable fluid lines 64a and 64b to the pneumatic cylinder 34. The air tank 36b is used to receive air displaced by the pneumatic cylinder 34. Line 64a is coupled to a head end of the cylinder 34 while line 64b is coupled to a rod end of the cylinder 34. Tank 36a supplies compressed air for actuating the cylinder 34 while tank 36b acts as a recovery tank for receiving and storing air discharged by the cylinder 34. This arrangement therefore forms a "closed loop" system which acts as an "air spring", and which is not adversely affected by dust and other contaminants in the ambient atmosphere surrounding the gate assembly 28. The pneumatic cylinder 34 is also preferable for durability purposes over conventional springs and like biasing devices which could weaken due to the high temperatures in the vicinity of the gate assembly 28.

The gate assembly 28 further includes an inner lower wall 66 having a generally saw-tooth shape. The injected tires slide upon the edges of the saw-teeth into the entrance chute 16, which is formed over an outer wall portion 67. The saw-tooth shape is preferred over a perfectly planar surface because it helps to enable the tires 46 (FIG. 1) to slide smoothly through the gate assembly 28. If a planar surface was used in lieu of the saw-tooth shape, the tires 46 would have a much greater percentage of area in contact with the surface, which itself is extremely hot. This could impede the smooth travel of the tires 46 through the gate assembly 28. The saw-tooth shape also causes a plurality of air passages 69 to be formed which allow air to flow therethrough due to a negative air pressure produced within the kiln 10. This further helps to keep the lower surface 66 relatively cool in comparison to the extremely high temperatures with the kiln 10.

With further reference to FIG. 5, the gate member 32 is pivotally supported by a pair of pivot shaft assemblies 68 which are in part supported within bearing retainer members 70. The pivot shaft assemblies 68 include square tubular drive portions 72a and 72b, which fit within opposite ends of a square tubular pivot portion 74 of the gate member 32. The square tubular drive portions 72a and 72b are secured to the square pivot portion 74 by a plurality of alloy pins 73 which are welded in place through apertures in the tubular pivot portion 74 of the gate member 32 and apertures in portion 72a. Generally cylindrical tubular members 76 fit within an end portion of each square tubular portion 72a and 72b are preferably welded thereto at notches 75. The cylindrical tubular members 76 thus support the gate 32 for pivotal movement within the bearing assemblies 70. Since portions 76, 72 and 74 are all tubular, air is free to circulate therethrough into an interior area of the gate member 32, thus helping to maintain the gate member 32 cool despite the extremely high temperatures the gate member 32 is exposed to. Moreover, the construction allows for a degree of expansion between the tubular portion 72b and the tubular pivot portion 74.

Referring now to FIGS. 6 and 7, the construction of the gate member 32 itself is shown in greater detail. With initial reference to FIG. 6, the tubular pivot portion 74 can be seen to include a plurality of openings 78 in communication with an interior area of the gate member 32. The interior area is further segmented by partitioning portions 80 which create a series of channels 82 within the gate member 32. Thus, air is free to pass into the tubular pivot portion 74, through the openings 78, through the channels 82 and out of lowermost openings 84 formed along a lowermost edge 86 of the gate member 32. With brief reference to FIG. 7, it can be seen that the gate member 32 includes an inner wall portion 88 and an outer wall portion 90 which help to form the channels 82. Allowing air to circulate through the gate member 32 thus helps to cool this component during operation of the kiln 10. Thus, tires which come into contact with the inner wall 88 during operation are less likely to pre-ignite and/or begin smoking due to such contact.

Referring now to FIGS. 8–11, the cam follower assembly 30 of the gate assembly 28 is shown in greater detail. The construction of the guide assembly 44 is also shown. With specific reference to FIGS. 8 and 9, the cam follower assembly 30 includes a cam follower roller 92 mounted for rotational movement via a suitable pin 94 to the end of a crank arm 96. The crank arm 96 is in turn pivotally mounted via a pivot pin 98 to a pivot arm 100. The pivot arm 100 is keyed to the cylindrical tubular member 76 via a key 102 which is welded to the cylindrical tubular member 76. With reference to FIG. 9, the key 102 engages a notch 104 in the pivot arm 100. Thus, as the pivot arm 100 moves rotationally it causes the cylindrical tubular member 76 to move rotationally therewith. Since member 76 is secured preferably by welding to the square tubular portion 72, which is in turn secured fixedly such as by welding to the pivot portion 74 of the gate member 32, the gate member 32 also moves rotationally in accordance with movement of the pivot arm 100.

With continued reference to FIG. 9, the pivot arm 100 is pivotally secured via a pin 105 and threaded coupling member 106a to a shaft 106 of the pneumatic cylinder 34. Thus, as the shaft 106 is urged outwardly of the cylinder 34 it causes the pivot arm 100 to rotate in a counterclockwise direction, when viewing FIGS. 8 and 9, which in turn causes the gate member 32 to be moved in a counterclockwise direction in accordance therewith.

With reference to FIGS. 9–11, the pivot arm 100 includes a pair of threaded adjustment bolts 108 having end portions 110 which engage a pair of arm portions 112 of the crank arm 96. The adjustment bolts 108 extend through threaded apertures 113 (FIG. 10) lock nuts 114 which serve to maintain the adjustment bolts 108 such that the end portions 110 of each extend outwardly of a flange portion 116 (FIGS. 9 and 11) a desired amount.

Figure 8:
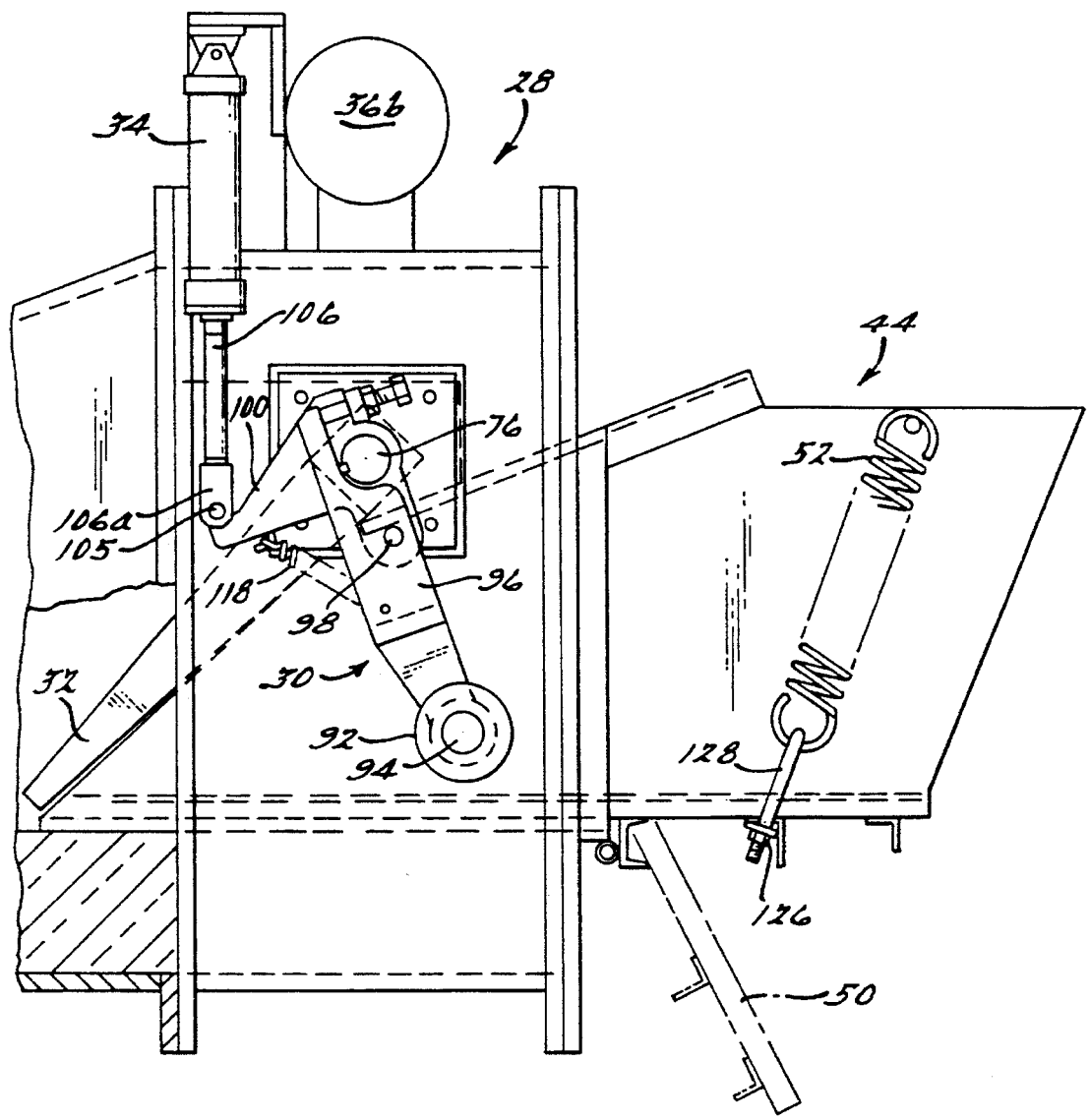
FIG. 8 is a side elevational view of the gate assembly.

The crank arm 96 is further biased in a clockwise direction when viewing FIGS. 8 and 9 by a spring 118 which is secured via an elbow member 120 to the pivot arm 100. The elbow member itself is threadably secured within a threaded opening 122 in the pivot arm 100. The other end of the spring 118 hooks around a pin 124 disposed through apertures 125 in the crank arm 96. The spring 118 serves to bias the crank arm 96 such that the arm portions 112 are in constant contact with the end portions 110 of the adjustment bolts 108.

With brief reference again to FIG. 8, the guide assembly 44 forms a mouth portion into which the tires 46 may be injected. The auxiliary lower relief door 50 is shown in phantom in the open position it would assume should it be forced open by one or more tires which become jammed inside the guide assembly 44. During normal operation the spring 52 biases the door 50 into a normally closed position. It will be noted that the biasing force of the spring 52 is adjustable via a threaded nut 126 and a threaded hook member 128 secured to the door 50.

Referring now to FIGS. 2–4 and 12–14, the operation of the tire injection system 12 will be described. During normal operation, the kiln 10, and thus the entrance chute 16, rotate in a counterclockwise direction when viewing FIG. 12. As the gate assembly 28 rotates towards the camming wall portion 38, the cam follower roller 92 engages a first sloped portion 130 of the inner camming surface 40 of the wall portion 38. At this point the gate member 32 is held in a closed position by the air cylinder 34, which itself receives compressed air from the compressed air tank 36a (with tank 36b being at zero psi or a low psi to thus act as a receiver tank for displaced air from the rod end of the air cylinder 34). The shaft 106 of the air cylinder 34 is at or near its maximum extended position, which causes the pivot arm 100 to be biased in a counterclockwise direction. This concurrently causes the gate member 32 itself to be biased into the normally closed position as well as causing the cam follower roller 92 and the crank arm 96 to be biased towards the inner camming surface 40 of the camming wall portion 38. Since the gate member 32 is closed, any tires which happen to be present in the gate assembly 28 or the guide assembly 44 are not allowed into the interior of the entrance chute 16.

With brief reference to FIG. 2, as the cam follower roller 92 rides up over the sloped portion 130 of the inner camming surface 40, the roller 92 is urged to the left in the drawing of FIG. 2. This in turn causes the pivot arm 100 to be urged concurrently therewith in a clockwise direction about the pivot axis of the gate member 32, which causes the gate member 32 to also be urged clockwise into the open position shown in FIG. 2. With brief reference to FIG. 3, the fluidized raw material 132 inside the kiln 10 is restricted by the dam 54 and upright wall portions 56 from entering the channel 62, and thus entering the entrance chute 16 while the gate member 32 is open. Thus, the area defined by the channel 62 is relatively free of the fluidized material 132 when the gate member 32 is open. At this point the inner end portion 24 of the entrance chute 16 is positioned within the bottommost 180° of rotation of the kiln 10, and most preferably at or near its lowest vertical point of travel during rotation of the kiln 10.

As soon as the gate member 32 is fully opened, the tire injecting apparatus 48 causes one or more tires 46 to be positively injected (i.e., propelled) into the guide assembly 44. The tires 46 are propelled through the guide assembly 44, through the gate assembly 28, through the entrance chute 16 and come to rest in the channel 62 (FIG. 4). As the kiln 10 continues to rotate counterclockwise the fluidized raw material 132 (FIG. 3) gradually flows over the upright side wall members 56, thus covering the tires. This gradual covering of the tires 46 significantly reduces the turbulence within the kiln 10 by eliminating the splash that would otherwise be caused if the tires 46 were dropped into the kiln when the entrance chute is at the twelve o'clock position (i.e., at its highest elevation during rotation of the kiln 10). This also helps to minimize the release of additional dust into the hot gas stream adjacent the entrance chute 16.

With continued reference to FIG. 2, as the kiln 10 continues to rotate in the counterclockwise direction, the gate member 32 remains open for the period of time during which the cam follower roller 92 rides along portion 134 of the inner camming surface 40 of the camming wall portion 38. During this time additional tires 46 may be injected into the guide assembly 44. Thus, the overall circumferential length of portion 134, in addition to the speed of rotation of the kiln 10, determine the length of time which the gate member 32 remains open.

During the time the gate member 32 is open, preferably one to about six tires 46 are injected by the injecting apparatus 48 during the course of preferably one to three injection cycles. Preferably, more than one injecting apparatus 48 is used to inject the tires 46. It will also be appreciated that the operation of each tire injecting apparatus 48 must be synchronized such that it begins positively injecting tires at precisely the time the guide assembly 44 has rotated to a position in at least partial alignment with the apparatus 48, such that at least one tire 46 can be injected into the guide assembly 44. This synchronization can be accomplished in many conventional ways such as mechanically by the use of some external member protruding from the guide assembly 44 which triggers a limit switch or similar device associated with the tire injecting apparatus 48 at the appropriate times of rotation of the kiln 10. Alternatively, conventional optical sensors may be used together with suitable electronic control circuitry to inform the tire injecting apparatus 48 that the guide assembly 44 has rotated into position such that a tire 46 can be injected.

As the cam follower roller 92 moves over the inner surface 40, compressed air from the air tank 36a causes the pneumatic cylinder 34 to constantly tend to urge the crank arm 94, and thus the cam follower roller 92, into engagement with the inner camming surface 40. As the cam follower roller 92 moves toward and onto portion 136 of the inner camming surface 40, the biasing force provided by the pneumatic cylinder 34 causes the cam follower roller 92 to maintain contact with portion 136, which causes the gate member 32 to begin pivoting towards the closed position. Once the cam follower roller 92 has rotated off of portion 136 in the counterclockwise direction, the gate member 32 is completely closed, as shown in FIG. 8. Thereafter, the gate member 32 remains biased closed by the pneumatic biasing force provided by the pneumatic cylinder 34 and compressed air in the air tank 36a. The gate member 32 remains closed during counterclockwise rotation of the kiln 10 until the gate assembly 28 has again rotated into position such that the roller 92 begins engaging sloped portion 130 (FIG. 2). Keeping the gate 32 closed when tires are not being injected is beneficial because it prevents a prolonged rush of cool air into the interior area 26 of the kiln 10.

Referring now to FIG. 14, the action of the cam follower assembly 30 can be seen in the event that the kiln has stopped and begun to rotate in the opposite, or clockwise, direction. As the cam follower roller 92 comes into contact with the edge 138 of portion 136 of the camming wall 38, the roller 92 is urged counterclockwise against the biasing force of spring 118. This causes the crank arm 96 to pivot about pivot pin 98. Since the arm portions 112 of the crank arm 96 move away from the adjustment bolts 108, the gate member 32 is not pivoted to the open position but rather remains closed in response to the biasing force provided by the pneumatic cylinder 34. As the cam follower roller 92 continues over portion 134 of the inner wall surface 40 while traveling in the clockwise direction, the gate member 32 remains biased to the closed position. The roller 92 continues to remain biased against the inner camming surface 40 by the biasing force of spring 118. Thus, the gate member 32 can only be opened when the kiln 10 is rotating in the proper desired direction (i.e., counterclockwise in the drawing of FIG. 2), and remains biased closed in the event the kiln 10 should stop rotating and begin rotating in the opposite, i.e., clockwise, direction.

The tire injection system 12 thus provides a significant benefit over prior developed systems which require tires, pieces of tires, or other items to be used as a source of supplemental fuel to be injected using gravity feed such that the tires or other fuel items are caused to be dropped from an elevationally high point, through the kiln interior, and into the fluidized material in the kiln. The tire injection system 12 of the present invention allows tires and virtually any other form of fuel packet or item to be injected tangentially into the interior area 26 of the kiln 10 without relying on gravity to accomplish any portion of the injection process. The dam 54 and sidewall members 56 cause the fluidized material 132 within the kiln 10 to thereafter gradually be poured over the tires, thereby significantly reducing the turbulence normally otherwise associated with the injection of tires. The apparatus 12 further is particularly well adapted to be used to enable whole tires to be injected. This is in contrast to prior systems which have required tires to be cut up or otherwise packaged into packets having rather specific, predetermined shapes. Thus, the apparatus of the present invention makes even better economical use of used tires as a supplemental source of heat for the kiln 10. Furthermore, the apparatus 12 may be retrofitted to existing rotary kilns if so desired provided suitable modifications are made to the kiln to accommodate the entrance chute 16 and the structure of the dam 54.

Referring now to FIG. 15, the tire injecting unit 48 shown in FIG. 2 is shown even more clearly. The tire injecting unit 48 includes rollers 47a, 47b, 47c and 47d, which are controlled as four independent groups of rollers 140, 142, 144 and 146. The group denoted by reference numeral 140 comprises the five rollers 47a, the group denoted by reference numeral 142 comprises the six rollers denoted by reference numeral 47c, the group 144 comprises the five rollers denoted by reference numeral 47b, and the group 146 comprises the six rollers denoted by reference numeral 47d. Each of the groups 140–146 of rollers is controlled independently by a motor 148, 150, 152 and 154, respectively. Each of the motors 148–154 are phase-controlled motors which are controlled by a suitable electronic control system 156.

With further reference to FIG. 15, the motor 148 drives the roller $47a_1$, the motor 150 drives the roller $47c_1$, the motor 152 drives the roller $47b_1$ and the motor 154 drives the roller $47d_1$. Each of the motors 148–154 is associated with a gear box 148a, 150a, 152a and 154a, respectively, and a gear box (not shown). Each of the gear boxes are further coupled to torque arms in the form of turnbuckles 156–162, respectively. The turnbuckles, in turn, are coupled to mounting plates 164–170, respectively. The turnbuckles 156–162 each help to absorb the torque generated on the gear boxes 148a–154a.

With further reference to FIG. 15, a main turnbuckle 172 is shown for adjusting an opening 174 into which the tires 46 are moved by a conventional conveyor assembly, as shown in phantom and denoted by reference numeral 176. To further enable the opening 174 to be adjusted, the group 142 of rollers 47c is associated with a support frame 178 which is pivotally disposed relative to the group 140 of rollers 47a. Thus, adjustment of the main turnbuckle 172 causes the entire group 142 of the rollers 47c to be pivoted such that the opening 174 may be either increased or decreased in height. It will also be appreciated that the rollers 47a are supported by a support frame 180 and the rollers 47b and the rollers 47d by a support frame 182.

Referring now to FIG. 16, a plan view of the groups 144 and 146 of rollers 47b and 47d, respectively, is shown. Each of the rollers 47b and 47d are journalled for rotational movement about a central shaft 184 extending therethrough. The roller 47b$_1$ further has its shaft 184 coupled to the motor 152 and is therefore driven by the motor 152. Each of the rollers 47b and 47d are further supported within a frame portion 186. Angle iron support members 188 are further disposed between the frame members 182 and 186 to add further rigidity and support. It will also be noted that the roller 47d$_1$ is coupled to the motor 154, and is thereby driven by the motor 154. Furthermore, it will be appreciated that each of the rollers 47a and 47c are supported and journalled for rotation in a manner identical to that shown in FIG. 16.

Figure 17:
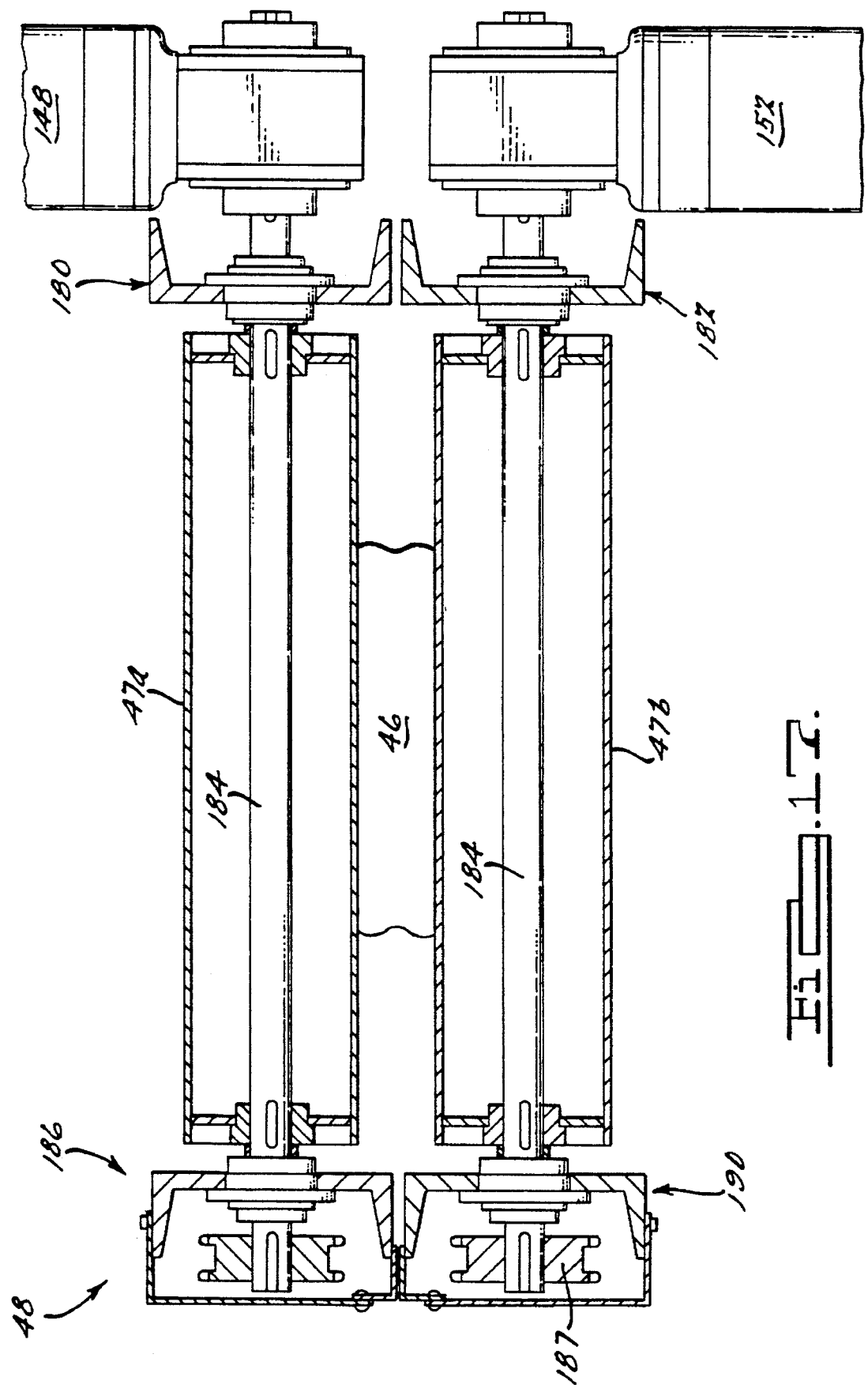
FIG. 17 is a cross sectional end view of the apparatus of FIG. 15 taken in accordance with section line 17—17 in FIG. 15.

Referring further to FIG. 16, each of the rollers 47b includes a gear or sprocket 187 (also shown clearly in FIG. 17). Similarly, the rollers 47d each include gears or sprockets 189. The sprockets 187 are intercoupled preferably by a suitable chain so that they all rotate simultaneously in response to a driving force generated by the motor 152. It will be appreciated, however, that a suitably strong belt or like element may be substituted for the chair. The sprockets 189 are similarly intercoupled to be driven together by the motor 154. With brief reference to FIG. 15, the rollers 47a also include gears or sprockets (not shown) and are ganged together such as by a chain (with the exception of one, such as roller 47a$_2$), to otherwise rotate in response to a driving force generated by the motor 148. Similarly, the rollers 47c include gears or sprockets (not shown) ganged together like the rollers 47b to rotate in the same direction in response to a driving force of the motor 150, with the exception of one roller 47c$_2$.

Referring now to FIG. 17, a cross sectional view of one each of the rollers 47a and 47b in accordance with section line 17—17 in FIG. 15 can be seen. The roller 47a and the roller 47b are preferably spaced in the range of about 3–6 inches apart, and more preferably about 4 inches apart. Each of the rollers 47a and 47b are further preferably about 40 inches in length and preferably about 8½ inches in diameter, and more preferably about 8⅝ inches in diameter. It will be appreciated, however, that these dimensions could vary significantly if needed to suit a specific application. The spacing between the rolls 47a and 47b is further such as to compress slightly each tire 46 as it moves between the rolls 47a and 47b. It has been found that, for example, compressing a tire having a width of roughly about 6 inches to about 4 inches–4½ inches in width works extremely well in enabling the tire 46 to be gripped and projected outwardly of the rollers 47a and 47b. With further reference to FIG. 17, the tire injecting apparatus 48 further includes a frame member 190 for supporting the rolls 47b and 47d.

With further brief reference to FIG. 15, it is preferable that at least one of the rollers 47a, such as the roller 47a$_2$, and one of the rollers 47c, such as roller 47c$_2$, be simply "idler" rollers associated with separate, conventional motion detectors to separately indicate when a tire 46 has reached the roller 47a$_2$ and the roller 47c$_2$. It will be appreciated, however, that these idler rollers could be one each in the groups 144 and 146 of rollers as shown in FIG. 15.

Referring further to FIG. 15, when a first tire 46 is presented by the conveyor assembly 176, it will be urged by the rollers 47c and 47d towards the rollers 47a and 47b. All of the rollers 47 (except rollers 47a$_2$ and 47c$_2$) at this time are driven at a first rotational speed by the motors 148–154 until the first tire 46 reaches and hits the roller 47a$_2$. At this point the motion detector associated with the roller 47a$_2$ detects the presence of the first tire 46 and electrically signals the electronic control system 156, which in turn shuts off the motors 148 and 152, while the motors 150 and 154 continue to operate. When a second tire 46 is presented from the conveyor 176, the motors 150 and 154 cause the rollers 47c and 47d to propel the second tire 46 until the electronic control system 156 detects a suitable signal from the motion detector associated with the idler roller 47c$_2$. At this point the system 156 turns off the motors 150 and 152.

When the gate member 32 rotates into position in approximate longitudinal alignment with the rollers 47a and 47b, and is urged into an open position, a limit switch (not shown) associated with the injection apparatus 48 is tripped by the tubular guide assembly 44 (FIG. 2). The limit switch is electrically coupled to the electronic controller system 156 and the system 156 responds to the signal from the limit switch by energizing each of the motors 148–154 simultaneously to run at a second speed which is faster than the first speed. The second speed is preferably about 200 rpm of the rollers 47a–47d, but it will be appreciated that this speed may vary significantly depending on the diameter of the rollers 47a–47d. The two tires 46 are then rapidly propelled out of the injection apparatus 48 into the guide assembly 44 as the kiln 10 rotates. The process is then repeated the next time the gate assembly 44 rotates into approximate alignment with the rollers 47a and 47b. It will be appreciated that the first speed at which the rollers 47a–47d rotate during the loading of the tires 46 into the injection apparatus 48 may also vary significantly. A speed which has been found to work well, however, is about 25 rpm to 30 rpm, and more preferably about 27 rpm for rollers having a diameter between about 8–9 inches. It will also be appreciated that a greater or lesser number of rollers 47 could be included to suit the needs of a specific application.

Preferably, several tire injecting apparatuses 48 will be disposed about the periphery of the cement kiln 10 to enable anywhere from about 2–10 tires to be injected into the interior area 26 of the kiln 10 during a single revolution of the kiln 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed:

1. Apparatus forming a rotary kiln having an injection system for injecting items to be used as a source of supplemental fuel into said kiln, said apparatus comprising:

a rotary kiln;

means associated with said rotary kiln for forming an entrance chute, said means for forming an entrance chute being in communication with an interior area of said rotary kiln;

gate means associated with said entrance chute means for closing said entrance chute means during predetermined degrees of rotation of said rotary kiln and for opening said entrance chute means such that an item to be used as a source of supplemental fuel may be injected thereinto during at least one predetermined period of rotational travel of said rotary kiln; and means for controlling said opening and closing of said gate means such that said gate means is opened during at least one predetermined period of rotational travel of said rotary kiln to allow said item to be used as a source of supplemental fuel to be injected into said entrance chute, and thus into said interior of said rotary kiln.

2. The apparatus of claim 1, wherein said means for forming an entrance chute is positioned tangentially to an outer surface of said rotary kiln.

3. The apparatus of claim 1, wherein said means for forming an entrance chute includes a portion extending within said interior of said rotary kiln to form a dam therein, said dam preventing fluidized material within said rotary kiln from exiting said interior area when said gate means is in said opened position.

4. Apparatus forming a rotary kiln having a tire injection system for injecting tires into said kiln, wherein said tires are used as a source of supplemental heat for said kiln, said apparatus comprising:

a rotary kiln;

means associated with said rotary kiln for forming an entrance chute positioned tangentially to an outer surface of said rotary kiln, said entrance chute means being in communication with an interior area of said rotary kiln;

gate means associated with said entrance chute means for closing said entrance chute means during predetermined degrees of rotation of said rotary kiln and for opening said entrance chute means such that a tire may be injected thereinto during a predetermined period of rotational travel of said rotary kiln; and means for controlling said opening and closing of said gate means such that said gate means is open during a predetermined period of rotational travel to allow said tire to be injected into said entrance chute.

5. The apparatus of claim 4, further comprising means for injecting said tires into said entrance chute means.

6. The apparatus of claim 4, wherein said entrance chute means comprises:

means forming a dam within an interior area of said rotary kiln to provide a channel within which said tires may be disposed before becoming immersed in a fluidized material within said interior area of said rotary kiln.

7. The apparatus of claim 4, wherein said means for controlling said opening and said closing of said gate means comprises a camming surface; and wherein said gate means comprises a cam follower and a pivotally mounted gate member;

said gate member being urged into an open position when said cam follower engages said camming surface and into a closed position when said cam follower moves out of contact with said camming surface.

8. Apparatus forming a rotary kiln having a tire injection system for injecting tires into said rotary kiln, wherein said tires are used as a source of supplemental heat for said kiln, said apparatus comprising:

a rotary kiln;

means forming an entrance chute associated with said rotary kiln such that an outer end portion of said entry chute means projects outwardly of an outer surface of said rotary kiln and an inner end portion of said entrance chute means projects into an interior area of said rotary kiln approximately tangentially to said outer surface;

means forming a dam associated with said inner end portion of said entrance chute means, said dam forming a channel into which a tire may enter when said tire is injected into said entrance chute means;

gate means associated with said outer end portion of said entrance chute means for controllably opening and closing said entrance chute means; and means for controllably opening and closing said gate means during a predetermined portion of rotational travel of said rotating kiln such that when said gate means is in said open position a tire may be injected through said entrance chute means into said channel, said means for controlling said gate means further being operable to close said gate means when said rotating kiln has rotated through said predetermined portion of rotational travel.

9. The apparatus of claim 8, wherein said gate means includes a pivotally mounted gate member and a cam follower assembly for urging said gate member between said open and closed positions; and wherein said means for controllably opening and closing said gate means includes a camming surface positioned adjacent said outer surface of said rotary kiln;

said cam follower assembly causing said gate member to be urged into said open position as a roller of said cam follower rides over said camming surface and urging said gate member into said closed position when said roller of said cam follower rolls off of said camming surface.

10. The apparatus of claim 8, further comprising means for injecting tires into said entrance chute means of said rotary kiln when said entrance chute means, has rotated to a position in general alignment with said tire injecting means.

11. The apparatus of claim 8, wherein said gate means includes a pivotally mounted gate member operable to rotate between open and closed positions; and wherein said gate member includes an outer wall, an inner wall, and a tubular pivot portion, said tubular pivot portion being in communication with an interior area defined by said outer and inner walls of said gate member to allow air to pass through said pivot portion and said internal area between said inner and outer walls of said gate member to thereby cool said gate member.

12. The apparatus of claim 8, wherein said entrance chute means includes a lower support surface having a saw-tooth shape upon which said tires may slide when injected into said entrance chute means.

13. The apparatus of claim 8, wherein said entrance chute means further comprises a guide assembly having an auxiliary lower relief door pivotally secured thereto for allowing one or more tires to drop out of said entrance chute means prior to entering said interior area of said rotary kiln should said one or more tires become jammed within said entrance chute means; and a spring for biasing said auxiliary lower relief door in a normally closed position.

14. The apparatus of claim 9, wherein said cam follower assembly includes a crank arm and a pivot arm fixedly secured to said gate member; and means for biasing said pivot arm, and therefor said crank arm, towards said camming surface.

15. The apparatus of claim 14, wherein said means for biasing said pivot arm comprises:

a pneumatic cylinder; and means for storing a source of fluid for said pneumatic cylinder.

16. Apparatus forming a rotary kiln having a tire injection system for injecting tires into said kiln, wherein said tires are used as a source of supplemental heat for said kiln, said apparatus comprising:

a rotary kiln having an outer wall and an interior area;

an entrance chute extending through said outer wall into said interior area tangentially to said outer wall;

a dam formed at an inner end portion of said entrance chute for preventing highly fluidized material within said kiln from flowing into said inner end portion of said entrance chute;

said entrance chute having a gate assembly at an outer end portion of said entrance chute extending outwardly of said outer wall of said kiln, said gate assembly including a pivotally mounted gate member movable between an open position and a closed position, wherein in said open position said gate member allows tires to be injected through said entrance chute into said interior area of said rotary kiln and when in said closed position prevents tires from entering said interior area, a cam follower assembly having a cam follower roller for urging said gate member into said open position, and pneumatic means for urging said gate member into a normally closed position;

a cylindrical camming wall disposed concentrically with outer wall of said rotary kiln so as to circumscribe a portion of said kiln, said cylindrical camming wall including a portion for causing said cam follower roller to urge said gate member into said open position when said cam follower roller rides on said portion.

17. The apparatus of claim 16, further comprising means for injecting tires into said outermost end portion of said entrance chute.

18. The apparatus of claim 17, wherein said outermost end portion of said entrance chute includes a guide assembly comprising:

a pivotally mounted lower door; and a spring for biasing said lower door in a normally closed position, said lower door operating to be forced open in response to a force created by a jam of at least one tire within said guide assembly to thereby allow said at least one tire to drop out through an opening defined by said lower door to relieve said jam.

19. The apparatus of claim 16, wherein said entrance chute includes a lower support surface having a saw-tooth shape in cross section, said tires being adapted to slide on said lower support surface when said tires are injected into said entrance chute.

20. The apparatus of claim 19, wherein said saw-tooth shaped lower support surface helps to form a plurality of air passages which permit air to flow around said support surface to thereby help cool said support surface.

21. The apparatus of claim 16, wherein said dam includes a pair of upright sidewall members forming a channel therebetween into which said tires may enter when said tires are injected into said entrance chute, said dam preventing fluidized material within said kiln from entering said channel until said kiln reaches a predetermined point of rotational movement.

22. A method for injecting items forming a source of supplemental heat into a rotating kiln, said method comprising the steps of:

providing a rotating kiln having an entrance chute orientated tangentially to an outer wall of said kiln, and wherein said entrance chute has a portion projecting into an interior area of said kiln closely adjacent an inner wall portion of said kiln;

causing said kiln to rotate;

causing items representing a source of supplemental fuel to be positively propelled into said entrance chute during rotation of said kiln during at least one predetermined portion of rotational travel of said kiln.

23. The method of claim 22, further comprising the step of:

defining a channel adjacent an outlet of said inner end portion of said entrance chute; and preventing highly fluidized material within said rotating kiln from entering said channel during said at least one predetermined portion of rotational travel of said kiln.

24. The method of claim 22, further comprising the step of:

providing a gate assembly at an outer end portion of said entrance chute; and causing said gate assembly to open to thereby admit a tire into said entry chute when said outlet of said inner end portion of said entrance chute is positioned within a lower half of rotational travel of said kiln.

25. Apparatus for use with a rotary kiln for injecting items forming a source of supplemental fuel into an interior area of the kiln during at least one predetermined portion of rotation of said kiln, said apparatus comprising:

an entrance chute having an inner end portion disposed within said interior area of said kiln and an outer end portion protruding outwardly of an outer wall of said kiln through an opening in said outer wall, said entrance chute further being orientated generally tangentially to said outer wall;

gate means associated with said outer end portion of said entrance chute for controllably opening and closing said entrance chute; and camming means for causing said gate means to be opened at a point during rotational travel of said kiln when an outlet of said entrance chute is positioned within a selected portion of travel of said kiln such that said items forming a supplemental fuel source may be propelled into said kiln through said entrance chute.

26. The apparatus of claim 25, further comprising means forming a dam adjacent said outlet of said entrance chute for keeping highly fluidized material within said kiln from entering said entrance chute while said items forming a supplemental fuel source are being propelled through said entrance chute into said interior of said kiln.

* * * * *

UNITED STATES PATENT AND TRADEMARK OFFICE
CERTIFICATE OF CORRECTION

PATENT NO. : 5,473,998

DATED : December 12, 1995

INVENTOR(S) : Donald S. Allen et al

It is certified that error appears in the above-indentified patent and that said Letters Patent is hereby corrected as shown below:

Col. 2, Line 32, "portion" should be --portions--

Col. 8, Line 29, "into-the" should be --into the--

Col. 11, Line 46, "rolls" should be --rollers--

Col. 11, Line 47, "rolls" should be --rollers--

Col. 11, Line 54, "rolls" should be --rollers--

Col. 12, Line 28, "gate" should be --guide--

Col. 14, Line 61, Claim 14, "therefor" should be --therefore--

Signed and Sealed this

Fourth Day of June, 1996

BRUCE LEHMAN

*Attest:*

*Attesting Officer*          *Commissioner of Patents and Trademarks*